(12) United States Patent
Ren et al.

(10) Patent No.: US 12,214,423 B2
(45) Date of Patent: Feb. 4, 2025

(54) HIGH-ENERGY BEAM ADDITIVE MANUFACTURING FORMING DEVICE AND FORMING METHOD

(71) Applicant: SHANGHAI UNIVERSITY, Shanghai (CN)

(72) Inventors: Zhongming Ren, Shanghai (CN); Jiang Wang, Shanghai (CN); Chaoyue Chen, Shanghai (CN); Sansan Shuai, Shanghai (CN); Tao Hu, Shanghai (CN); Ruixin Zhao, Shanghai (CN); Wei Liu, Shanghai (CN)

(73) Assignee: SHANGHAI UNIVERSITY (CN)

( * ) Notice: Subject to any disclaimer, the term of this patent is extended or adjusted under 35 U.S.C. 154(b) by 493 days.

(21) Appl. No.: 17/635,442

(22) PCT Filed: Sep. 17, 2020

(86) PCT No.: PCT/CN2020/115774
§ 371 (c)(1),
(2) Date: Feb. 15, 2022

(87) PCT Pub. No.: WO2021/237984
PCT Pub. Date: Dec. 2, 2021

(65) Prior Publication Data
US 2022/0288695 A1    Sep. 15, 2022

(30) Foreign Application Priority Data
May 25, 2020    (CN) .......................... 202010446774.2

(51) Int. Cl.
*B22F 10/28*    (2021.01)
*B22F 10/30*    (2021.01)
(Continued)

(52) U.S. Cl.
CPC .............. *B22F 10/28* (2021.01); *B22F 10/30* (2021.01); *B22F 12/20* (2021.01); *B22F 12/30* (2021.01);
(Continued)

(58) Field of Classification Search
CPC .......... B22F 10/28; B22F 10/30; B22F 12/20; B22F 12/30; B22F 12/40; B22F 12/41;
(Continued)

(56) References Cited

U.S. PATENT DOCUMENTS

2016/0199907 A1* 7/2016 Jarvis ..................... B22D 19/16
75/10.67

FOREIGN PATENT DOCUMENTS

CN    105522153    4/2016
CN    105798299    7/2016
(Continued)

OTHER PUBLICATIONS

CN-106825565-A: Espacenet English machine translation (Year: 2017).*
(Continued)

*Primary Examiner* — Adil A. Siddiqui
(74) *Attorney, Agent, or Firm* — Onello & Mello, LLP

(57) ABSTRACT

A high-energy beam additive manufacturing forming device and forming method, comprising a magnetic field unit for assisting additive forming, and further comprising a forming base (6) for placing a material (12) to be processed, and a high-energy beam generation device which emits a high-energy beam, acts on the material (12) to be processed and forms a molten pool (15). The magnetic field unit comprises a first magnetic field generating device (7), and the first magnetic field generating device (7) comprises an induction coil (20) provided below the molten pool (15). The first magnetic field generating device (7) is detachably provided
(Continued)

below a surface, used for containing the material (12) to be processed, of the forming base (6); second magnetic field generating devices (16) are provided above the forming base (6).

7 Claims, 2 Drawing Sheets

(51) Int. Cl.
| | |
|---|---|
| *B22F 12/20* | (2021.01) |
| *B22F 12/30* | (2021.01) |
| *B22F 12/40* | (2021.01) |
| *B22F 12/41* | (2021.01) |
| *B22F 12/45* | (2021.01) |
| *B22F 12/50* | (2021.01) |
| *B22F 12/60* | (2021.01) |
| *B33Y 10/00* | (2015.01) |
| *B33Y 30/00* | (2015.01) |

(52) U.S. Cl.
CPC .............. *B22F 12/40* (2021.01); *B22F 12/41* (2021.01); *B22F 12/45* (2021.01); *B22F 12/50* (2021.01); *B22F 12/60* (2021.01); *B22F 2998/10* (2013.01); *B33Y 10/00* (2014.12); *B33Y 30/00* (2014.12)

(58) Field of Classification Search
CPC .......... B22F 12/45; B22F 12/50; B22F 12/60; B22F 2998/10; B22F 2999/00; B22F 12/00; B22F 2003/1053; B22F 2202/05; B22F 2202/07; B33Y 10/00; B33Y 30/00; B33Y 50/02; Y02P 10/25
See application file for complete search history.

(56) References Cited

FOREIGN PATENT DOCUMENTS

| | | | |
|---|---|---|---|
| CN | 106141185 | | 11/2016 |
| CN | 106825565 | | 6/2017 |
| CN | 106825565 A | * | 6/2017 |
| CN | 109332701 | | 2/2019 |
| CN | 111299582 | | 6/2020 |
| CN | 111558718 | | 8/2020 |
| JP | 2010118486 | | 5/2010 |

OTHER PUBLICATIONS

International Search Report dated Jan. 27, 2021 issued in corresponding International Application No. PCT/CN2020/115774, with English translation.

* cited by examiner

HIGH-ENERGY BEAM ADDITIVE MANUFACTURING FORMING DEVICE AND FORMING METHOD

CROSS REFERENCE TO RELATED APPLICATIONS

This patent application is a national stage application of International Patent Application No. PCT/CN2020/115774, filed on Dec. 2, 2021, which claims priority of Chinese Patent Application No. 202010446774.2, filed on May 25, 2020, the disclosure of which is incorporated by reference herein in its entirety as part of the present application.

TECHNICAL FIELD

The present disclosure relates to the field of metal additive manufacturing process control, in particular to a high-energy beam additive manufacturing forming device and a forming method.

BACKGROUND ART

The additive manufacturing technology is also called 3D printing technology and is based on the layering-superposition principle. A computer is used for controlling the motion track of a high-energy laser beam/electron beam/electric arc, the high energy of the laser beam/electron beam/electric arc is used for melting metal powder, and after the high-energy beam melts the metal powder, molten metal forming a molten pool is rapidly cooled and solidified. The whole additive manufacturing process comprises a forming step of high-energy beam light spot movement from point to surface and then from surface to body. The point-line-surface-body integrated processing mode has unique advantages in the aspect of manufacturing complex-shaped components. Due to the characteristics of high material utilization rate, short production and manufacturing cycle, high design freedom degree and the like, the technology provides a new solution for the weight reduction design and manufacturing problems of complex structural parts in the fields of aerospace, automobiles, ships, energy, chemical engineering, medical treatment and the like.

The 3D printing technology has many advantages, but the formed part still has defects, and even if the compactness of a component formed by the 3D printing technology is high, some internal defects such as difficult-to-control structure, formation of residual stress, microcracks, balling, pores and other defects in the part forming process are difficult to avoid. Due to the technological characteristics of material accumulation forming, the internal defects are difficult to avoid in metal additive manufacturing, and therefore the performance and application of components are affected. The machining process of metal additive manufacturing is the interaction of laser beams/electron beams/electric arcs and powder on the micron scale. When the laser beams/electron beams/electric arcs act on the metal powder, the metal powder is continuously subjected to an alternating process of rapid heating and rapid cooling, so that the heating melting, solidifying and cooling speeds of the molten pool and the nearby parts of the molten pool are higher than those of the surrounding areas. The melting and solidification behaviors in the area belong to unsteady-state and unbalanced processes, and larger temperature gradients (capable of reaching $10^6$ K/m) exist in the micro-scale molten pool. Under the effects of higher temperature gradients and surface tension gradients, Marangoni convection is unstable, the solidification speed is accelerated ($10^4$ K/s), the deviation of balance characteristics is more remarkable, and then the generation of solidification structures and defects is influenced, and the performance of preparation components is greatly influenced. An authorized patent CN105522153B discloses an electromagnetic field assisted laser additive manufacturing device. An insulating heat dissipation layer is arranged below a substrate, a magnetic field generating device is arranged below the insulating heat dissipation layer, a plurality of magnetic generating rods are arranged in the magnetic field generating device, and the magnetic generating rods generate a high-frequency magnetic field to oscillate and stir molten pools at different positions, so that the internal quality of additive manufacturing pieces is improved. However, magnetic induction lines emitted by the magnetic generating rods are diverged in the radial direction of the magnetic generating rods, so that the control effect of the magnetic field on the additive forming is reduced. Therefore, in order to popularize and expand the application of the additive manufacturing technology, how to more effectively control the melting-solidification process of additive manufacturing, further regulate and control the solidification structure, reduce defects and finally obtain a metal component with excellent mechanical properties is a difficult problem to be solved urgently.

SUMMARY

The present disclosure aims to provide a high-energy beam additive manufacturing forming device and a forming method to solve the problems in the prior art, so that a magnetic field can control melt convection and temperature distribution in the metal additive manufacturing process, refine a grain structure, reduce component segregation and reduce a temperature gradient to achieve the purpose of reducing residual stress. Therefore, the mechanical property of the metal component is remarkably improved.

To achieve the purpose, the present disclosure provides the following scheme: the present disclosure provides a magnetic field unit for assisting additive forming, comprising a first magnetic field generating device, wherein the first magnetic field generating device comprises induction coils arranged below a molten pool, and at any time, the molten pool formed by melting a material to be processed is located in an area, where clustered magnetic induction lines are emitted, of the induction coils.

The present disclosure also has the following characteristics:

Preferably, when the number of the induction coils is multiple, the induction coils are evenly arranged in the forming area of the molten pool.

Preferably, the adjacent induction coils are parallel, and the distances between the induction coils and the molten pool are equal.

Preferably, magnetic field unit for assisting additive forming further comprises second magnetic field generating devices which generate a steady-state magnetic field and/or an alternating magnetic field and act on the molten pool, wherein the second magnetic field generating devices are arranged above the molten pool.

The present disclosure provides a high-energy beam additive manufacturing forming device, comprising a magnetic field unit for assisting additive forming, further comprising a forming base for placing a material to be processed, and a high-energy beam generation device which emits a high-energy beam, acts on the material to be processed and forms a molten pool, wherein the high-energy beam generation device is arranged above the forming base, the first magnetic field generating device is detachably arranged below a surface, used for containing the material to be processed, of the forming base, and the second magnetic field generating devices are arranged above the forming base.

Preferably, the forming base is of a hollow box-shaped structure, the induction coils and a water cooling device used for cooling the induction coils are sequentially arranged in the forming base, the water cooling device is arranged below the induction coils, and an insulating heat dissipation layer is arranged between the induction coils and the water cooling device.

Preferably, the high-energy beam additive manufacturing forming device further comprises a first lifting device used for pushing the forming base to move up and down, wherein the first lifting device is arranged below the forming base, and a lifting part of the first lifting device is fixedly connected with the forming base; preferably, the high-energy beam additive manufacturing forming device further comprises a feeding device arranged on one side of the forming base, and the feeding device comprises a powder supply cylinder used for storing a material to be processed and a roller used for evenly laying the material to be processed to the forming base; and a feeding bottom plate used for supporting the material to be processed to move up and down and a second lifting device for pushing the feeding bottom plate to move up and down are arranged in the powder supply cylinder, and a lifting part of the second lifting device is fixedly connected with the feeding bottom plate.

Preferably, the high-energy beam additive manufacturing forming device further comprises a closed working cavity and a gas protection unit used for filling protection gas into the working cavity, and the high-energy beam generation device, the forming base, the feeding device and the second magnetic field generating devices are all arranged in the working cavity.

The present disclosure also provides a high-energy beam additive manufacturing forming method, applying the high-energy beam additive manufacturing forming device, comprising the following steps:

(a) placing a material to be processed on the forming base;
(b) generating a high-energy beam by a high-energy beam generation device, wherein the high-energy beam acts on the material to be processed in a set path, so that a molten pool is formed by the material to be processed;
(c) loading alternating voltage by a first magnetic field generating device, so that the induction coils generate an alternating magnetic field to act on the molten pool; and
(d) stacking a plurality of additive forming layers to obtain a forming part.

Preferably, in the step (c), the induction coils, corresponding to a high-energy beam processing area, in the first magnetic field generating device are used for loading alternating voltage; and preferably, in the step (c), a steady-state magnetic field and/or an alternating magnetic field generated by second magnetic field generating devices act/acts on the molten pool.

Compared with the prior art, the present disclosure has the following technical effects:

Firstly, the induction coils are arranged below the molten pool, and the molten pool is located in the area, where clustered magnetic induction lines are emitted, of the induction coils, so that the clustered magnetic induction lines penetrate through the molten pool, the magnetic field intensity where the molten pool is located is concentrated, the control effect of the magnetic field on additive forming is improved, and the control efficiency of the magnetic field unit on the molten pool is improved.

Secondly, the induction coils below the molten pools are evenly arranged, and the distances between the induction coils and the molten pools are equal, so that the magnetic field intensity of each molten pool is uniform during additive forming, and then the forming quality of the additive forming layers is ensured to be uniform.

Thirdly, the second magnetic field generating devices are arranged above the molten pool, and a magnetic field generated by the second magnetic field generating devices acts on the molten pool, so that the forming quality of the upper surfaces of the additive forming layers is improved.

Fourthly, the magnetic field generated by the first magnetic field generating device and the second magnetic field generating devices is adopted to carry out non-contact control on the molten pool, so that the problem concerning the melt flow and temperature distribution in the molten pool are uncontrollable in the forming process of additive manufacturing forming metal parts is solved, and quality control in the additive manufacturing process is realized. Internal defects such as air holes and cracks possibly occurring in the metal parts are avoided, and the comprehensive mechanical property of metal components is improved.

Fifthly, by arranging the feeding device, the material to be processed can move up and down under the dragging action of the feeding bottom plate, and can be evenly laid on the forming base under the pushing action of the roller, so that the laying efficiency of the material to be processed is improved.

Sixthly, during high-energy beam additive manufacturing forming, the induction coils corresponding to the high-energy beam processing area in the first magnetic field generating device are used for loading alternating voltage, so that the energy consumption of the induction coils is reduced, and the influence on the magnetic field of the induction coils in the processing area caused by starting of the induction coils in the non-processing area is avoided.

Reference signs: 1, controller; 2, laser emitter; 3, scanning galvanometer; 4, high-energy beam; 5, gas protection unit; 6, forming base; 7, first magnetic field generating device; 8, insulating heat dissipation layer; 9, water cooling device; 10, first lifting device; 11, second lifting device; 12, material to be processed; 13, roller; 14, additive forming layer; 15, molten pool; 16, second magnetic field generating device; 17, forming cylinder; 18, powder supply cylinder; 19, feeding bottom plate; and 20, induction coil.

DETAILED DESCRIPTION OF THE EMBODIMENTS

The following clearly and completely describes the technical scheme in the embodiments of the present disclosure regarding the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The present disclosure aims to provide a high-energy beam additive manufacturing forming device and a forming method to solve the problems in the prior art, so that a magnetic field can control melt convection and temperature distribution in the metal additive manufacturing process, refine a grain structure, reduce component segregation and reduce a temperature gradient to achieve the purpose of reducing residual stress. Therefore, the mechanical property of the metal component is remarkably improved.

To make the foregoing objective, features and advantages of the present disclosure clearer and more comprehensible, the present disclosure is further described in detail below with reference to the attached figures and specific embodiments.

Figure 1:
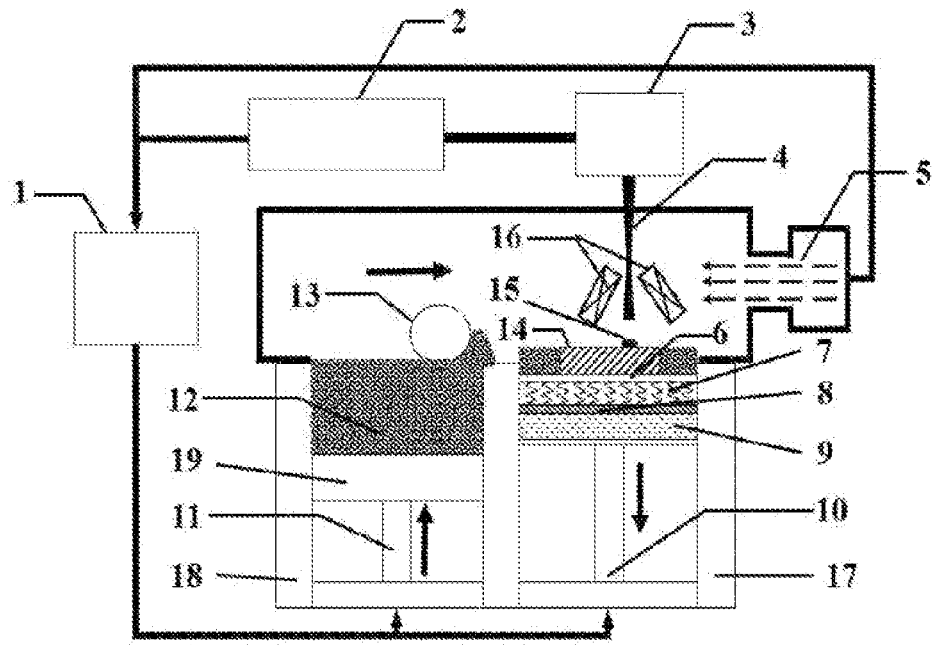
FIG. 1 is a structural diagram of a high-energy beam additive manufacturing forming device in the present disclosure.
Figure 2:
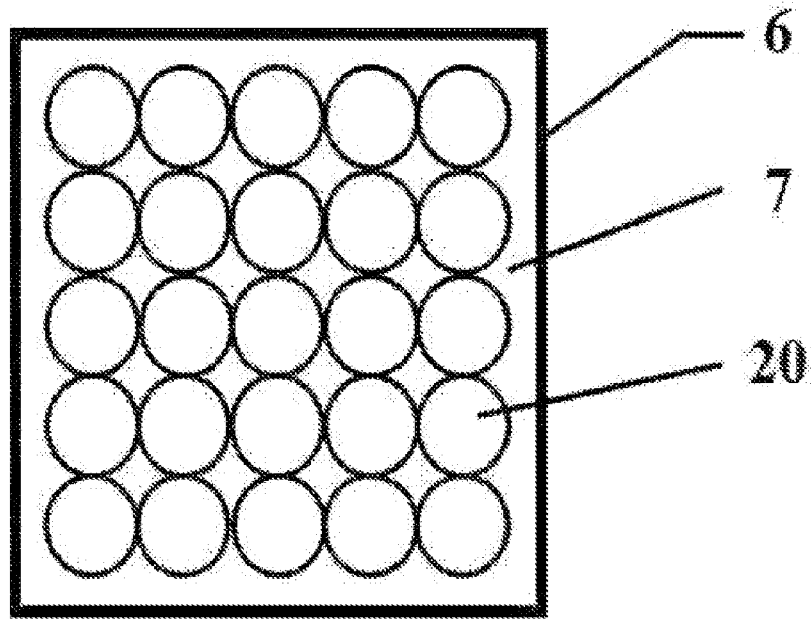
FIG. 2 is a top view of a first magnetic field generating device in the present disclosure.
Figure 3:
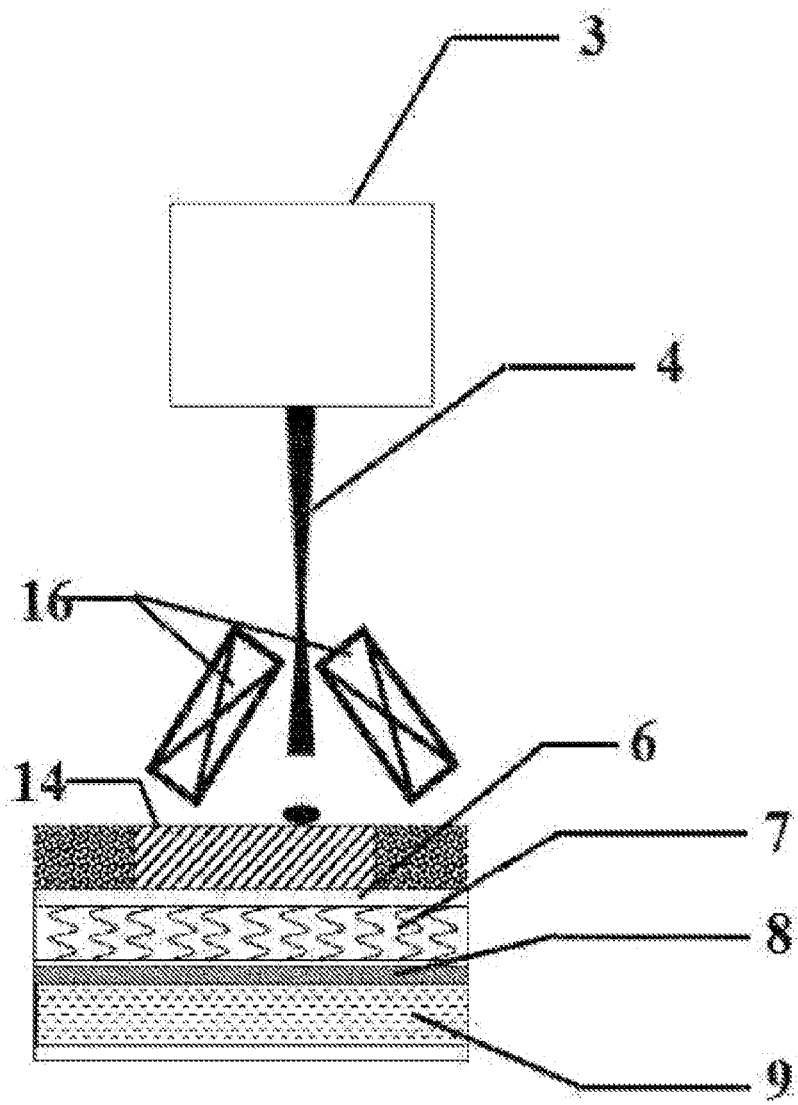
FIG. 3 is a structural diagram of a high-energy beam additive manufacturing forming device in the present disclosure.

Please refer to FIG. 1 to FIG. 3.

Embodiment I

As shown in FIG. 1 to FIG. 3, the embodiment provides a magnetic field unit for assisting additive forming, comprising a first magnetic field generating device 7, wherein the first magnetic field generating device 7 comprises induction coils 20 arranged below a molten pool 15, clustered magnetic induction lines generated by the induction coils 20 can penetrate through the molten pool 15, and at any time, the molten pool 15 formed by melting a material 12 to be processed is located in an area, where the clustered magnetic induction lines are emitted, of the induction coils 20.

Before additive forming, the induction coils 20 are connected with a direct-current power supply or an alternating-current power supply to generate a steady-state magnetic field or an alternating magnetic field, and the clustered magnetic induction lines are generated in the middle of the induction coils 20 and penetrate through the lower portion of the forming face of the molten pool 15. During additive forming, the material 12 to be processed receives heat energy of a high-energy beam 4 and then is melted to form the molten pool 15, melt in the molten pool 15 diffuses and flows from the center to the periphery, and the flowing direction of the melt is not parallel to the directions of the magnetic induction lines generated in the induction coils 20, so that the flowing melt cuts the magnetic induction lines to generate induction current, and the charged melt is subjected to Lorentz force opposite to the original movement direction in the magnetic field, so that the melt flow in the molten pool 15 is restrained by the Lorentz force, the molten pool 15 has the tendency of shrinking towards the center, the phenomenon that the material 12 to be processed adheres to the peripheral edge of the molten pool 15 is reduced, and the purpose of regulating and controlling the surface roughness of the part is achieved. On the other hand, as there is a temperature difference inside the melt pool 15, the temperature difference causes a thermal potential difference to be generated inside the melt pool 15, sequentially, a thermal current is formed inside the conductive metal melt, a thermoelectric force is generated under the action of the magnetic field, and dendrites or dendritic arms at the front edge of the solid-liquid interface of the melt pool 15 are broken off through the thermoelectric force. The broken dendrites are regarded as new heterogeneous nucleation sites to induce isometric crystals to grow, so that the effect of refining the solidification structure in the molten pool 15 is achieved. As the molten pools 15 are all located in the area, where clustered magnetic induction lines are emitted, of the induction coils 20, the clustered magnetic induction lines penetrate through the molten pools 15, the magnetic field intensity of the molten pools 15 is concentrated, and then the control effect of the magnetic field on additive forming is improved.

Embodiment II

As shown in FIG. 1 to FIG. 3, the embodiment provides a magnetic field unit for assisting additive forming, on the basis of the first embodiment, the magnetic field unit for assisting additive forming in the embodiment has the following characteristics:

In order to make the magnetic field where the molten pool 15 is located uniform, the induction coils 20 arranged below the molten pool 15 are perpendicular to the plane where the molten pool 15 is located, so that the clustered magnetic induction lines generated by the induction coils 20 can penetrate through the molten pool 15 from the lower portion of the molten pool 15. The number of the induction coils 20 can be one or more. When the number of the induction coils 20 is one, the forming range of the molten pool 15 is located within the inner diameter range of the induction coils 20. When the number of the induction coils 20 is multiple, the multiple induction coils 20 are arrayed in the forming area of the molten pool 15 in the transverse direction and the longitudinal direction, and the distances between the induction coils 20 and the molten pool 15 are equal. Therefore, the magnetic field intensity generated by each induction coil 20 in the corresponding molten pool 15 area is the same, the overall magnetic field intensity of the forming area of the molten pool 15 is uniform, the uniform forming effect of additive forming is further guaranteed, and the quality of additive forming is improved.

Furthermore, in order to improve the quality of the upper surfaces of the additive forming layers, the second magnetic field generating devices 16 are further arranged above the molten pool 15, the magnetic field generated by the second magnetic field generating devices 16 directly acts on the upper surface of the molten pool 15, and when the melt in the molten pool 15 flows from the center to the periphery, meanwhile, current is generated due to cutting of the magnetic induction lines of the second magnetic field generating devices 16, the Lorentz force generated under the action of the magnetic field has the effect of restraining melt flow, the molten pool 15 has the effect of shrinking towards the center, a powder sticking phenomenon around the molten pool 15 is reduced, and finally a three-dimensional solid part with the smooth surface is formed. Therefore, the purpose of regulating and controlling the surface roughness of the part is achieved; the magnetic field generated by the second magnetic field generating devices 16 can be a steady-state magnetic field or an alternating magnetic field, and when the second magnetic field generating devices 16 are used for generating the alternating magnetic field, the second magnetic field generating devices 16 can be induction coils capable of being connected with an alternating-current power supply or other devices capable of generating the alternating magnetic field; when the second magnetic field generating devices 16 are used for generating a steady-state magnetic field, the second magnetic field generating devices 16 can be induction coils, magnets or other devices capable of being connected with a direct-current power supply to generate a steady-state magnetic field.

Embodiment III

As shown in FIG. 1 to FIG. 3, the embodiment provides a high-energy beam additive manufacturing forming device, on the basis of the second embodiment, the high-energy beam additive manufacturing forming device in the embodiment has the following characteristics:

The high-energy beam additive manufacturing forming device comprises a magnetic field unit for assisting additive forming, a forming base 6 and a high-energy beam generation device; the forming base 6 is of a hollow box-shaped structure, the upper surface of the forming base 6 is a forming face used for additive forming, the forming face is a plane, and the second magnetic field generating devices 16 are arranged above the forming face. A first magnetic field generating device 7 and a water cooling device 9 used for cooling the first magnetic field generating device 7 are sequentially arranged in the forming base 6 from top to bottom, an insulating heat dissipation layer 8 is arranged between the first magnetic field generating device 7 and the water cooling device 9, and the insulating heat dissipation layer 8 and the water cooling device 9 are both detachably connected with the forming base 6. The first magnetic field generating device 7 is detachably connected with the forming base 6, specifically, all the induction coils 20 can be evenly arranged on the insulating heat dissipation layer 8, when the insulating heat dissipation layer 8 and the forming base 6 are detached, all the induction coils 20 can be separated from the forming base 6 along with the insulating heat dissipation layer 8, and therefore replacement of the induction coils 20 is facilitated. The induction coils 20 with different turns are replaced to generate magnetic fields with different strengths so as to oscillate melts of the molten pool 15 at different height positions, and control over melt convection and temperature distribution of solidification of a metal component is achieved. Moreover, when the heat of the induction coils 20 is too high, a cooling device can be started to cool the induction coils 20 to maintain normal operation of the induction coils 20.

The high-energy beam generation device is used for generating a high-energy beam 4 and acting on a material 12 to be processed to form the molten pool 15, the high-energy beam 4 can be a laser beam, an electron beam, an electric arc or other energy beams capable of generating a heat source, and when the high-energy beam 4 is a laser beam, the high-energy beam generation device comprises a laser emitter 2 and a scanning galvanometer 3, and the laser emitter 2 is any one of a CO2 gas laser, a solid Nd-YAG laser and an optical fiber laser. The scanning galvanometer 3 is controlled by the controller 1, so that the high-energy beam 4 can be accurately positioned at any position of a processing surface.

Furthermore, in order to facilitate additive manufacturing forming, the high-energy beam additive manufacturing forming device further comprises a first lifting device 10 used for pushing the forming base 6 to move up and down, the first lifting device 10 is arranged below the forming base 6, and a lifting part of the first lifting device 10 is fixedly connected with the forming base 6. Preferably, the high-energy beam additive manufacturing forming device further comprises a forming cylinder 17, and the forming base 6 slides up and down along the inner wall of the forming cylinder 17. The first lifting device 10 is a first hydraulic cylinder, the end of a piston rod of the first hydraulic cylinder is fixedly connected with the lower portion of the forming base 6, and a cylinder barrel of the first hydraulic cylinder is fixedly connected with the bottom of the forming cylinder 17.

Furthermore, in order to conveniently supply the material 12 to be processed to the forming base 6, the high-energy beam additive manufacturing forming device further comprises a feeding device arranged on one side of the forming base 6, and the feeding device comprises a powder supply cylinder 18 used for storing the material 12 to be processed and a roller 13 used for evenly laying the material 12 to be processed to the forming base 6; a feeding bottom plate 19 used for supporting material 12 to be processed to move up and down and a second lifting device 11 for pushing the feeding bottom plate 19 to move up and down are arranged in the powder supply cylinder 18, a lifting part of the second lifting device 11 is fixedly connected with the feeding bottom plate 19, preferably, the second lifting device 11 is a second hydraulic cylinder, the end of a piston rod of the second hydraulic cylinder is fixedly connected with the feeding bottom plate 19, a cylinder barrel of the second hydraulic cylinder is fixedly connected with the bottom of the powder supply cylinder 18, preferably, the roller 13 can move in the direction parallel to the forming face so that the material 12 to be processed of the powder supply cylinder 18 can be pushed to the forming face of the forming base 6 from one side of the forming base 6, and the roller 13 can move in the direction perpendicular to the forming face, so that the roller 13 moves upwards or downwards after material spreading is completed and then moves towards the powder supply cylinder 18 in the direction parallel to the forming face, and the roller 13 can flatten the material 12 to be processed laid on the forming face in the resetting process.

Furthermore, in order to guarantee a good additive forming environment, the high-energy beam additive manufacturing forming device is arranged in a closed working cavity, the working cavity communicates with a gas protection unit 5, the gas protection unit 5 is used for introducing inert gas into the working cavity, and the inert gas can be argon, helium or other inert gas and mixtures thereof. The gas protection unit 5 is continuously filled with inert gas in the additive forming process so as to prevent the material 12 to be processed or the molten pool 15 formed by the material 12 to be processed from reacting with gas in the environment in the additive forming process to affect the quality of the additive forming layers 14.

Furthermore, a controller 1 is further arranged in the high-energy beam additive manufacturing forming device, and the high-energy beam generation device, the first magnetic field generating device 7, the second magnetic field generating devices 16, the first lifting device 10, the second lifting device 11 and the roller 13 are all electrically connected with the controller 1.

Embodiment IV

As shown in FIG. 1 to FIG. 3, the embodiment provides a high-energy beam additive manufacturing forming method, on the basis of the third embodiment, the high-energy beam additive manufacturing forming method in the embodiment has the following characteristics:

The high-energy beam additive manufacturing forming method specifically comprises the following steps:
    firstly, selecting a material 12 to be processed with a suitable powder particle size, and drying the material 12 to be processed, wherein the material 12 to be processed is preferably a non-magnetic material and can be powder of any one or more of stainless steel, titanium, titanium alloy, aluminum, aluminum alloy, copper, copper alloy, nickel, nickel alloy, cobalt-chromium alloy and other metals;

secondly, laying the material 12 to be processed on the forming face of the forming base 6;

thirdly, during additive molding, firstly, slicing and layering the three-dimensional digital model of the metal part through special software to obtain the contour data of each section, and then melting the material 12 to be processed layer by layer according to the contour data of the current additive molding layer 14 of the three-dimensional digital model by utilizing the high-energy beam 4 to form the molten pool 15;

fourthly, connecting the induction coils 20 of the first magnetic field generating device 7 with an alternating-current power supply to generate an alternating magnetic field to act on the molten pool 15, wherein the solidification process of the molten pool 15 on each additive forming layer 14 is regulated and controlled, the magnetic field intensity generated by the alternating magnetic field ranges from 0 T to the magnetic field intensity limit reached by the induction coils 20, flow of melt in the molten pool 15 is regulated and controlled through a Lorentz force, and convection generated in the molten pool 15 can enable the solid-liquid interface to keep the same temperature gradient, the purposes of refining structure grains and improving the comprehensive mechanical property of the metal component are achieved, meanwhile, internal defects such as air holes and cracks possibly occurring in an additive manufacturing forming metal part are avoided, and the forming quality of the current additive forming layer 14 is improved; and fifthly, after the high-energy beam 4 is moved away from the current action position, cooling and solidifying the molten pool 15 on the forming face of the forming base 6, wherein after the current additive forming layer 14 is manufactured, a layer of material 12 to be processed is evenly laid on the upper surface of the current additive forming layer 14 again, preparation is made for manufacturing of the next additive forming layer 14, and then the additive forming layers 14 are manufactured layer by layer, and finally, a plurality of additive forming layers 14 are stacked to form the whole part.

Furthermore, in the step (4), after the first magnetic field generating device 7 works according to the contour information of the current additive forming layer 14 obtained in the step (3), the induction coils 20 in the area corresponding to the current additive forming layer 14 are started, and after the current additive forming layer 14 is finished, the induction coils 20 stop supplying power.

Furthermore, in the step (4), the steady-state magnetic field and/or the alternating magnetic field generated by the second magnetic field generating devices 16 act/acts on the molten pool 15, and the forming quality and the surface quality of the current additive forming layer 14 are further improved through the Lorentz force generated by the second magnetic field generating devices 16.

Preferably, in the step (2), the forming base 6 is made of a Ti6Al4V titanium alloy material, a proper method is selected to conduct demagnetization treatment on the forming base 6 before use, meanwhile, dirt and an oxide layer on the surface of the forming base 6 are removed through polishing, and the surface of the forming face is kept smooth and clean. Preferably, acetone and an alcohol solution are used for removing oil stains on the surface of the forming base 6, and then the forming base 6 is subjected to drying treatment. The alternating magnetic field generated after alternating current is introduced into the induction coils 20 in the forming base 6 penetrates through the forming base 6, and eddy current is generated on the forming base 6, so that the forming base 6 is heated, and a preheating effect is generated on the material 12 to be processed placed on the forming base 6.

Preferably, in the step (1), the material 12 to be processed is spherical Ti6Al4V titanium alloy powder with the particle size of 0-53 μm, the alloy powder is dried, and the dried Ti6Al4V powder is obtained to serve as a raw material of the additive forming part.

Preferably, in the step (2) and the step (5), the material 12 to be processed in the powder supply cylinder 18 is laid on the forming ace by using the roller 13, specifically, a feeding bottom plate 19 in the powder supply cylinder 18 ascends by a certain height under the pushing action of a second hydraulic cylinder, the forming base 6 in a forming cylinder 17 descends by a certain spreading height under the pushing action of a first hydraulic cylinder, and then the roller 13 horizontally moves in the direction of the forming face of the forming base 6, the powder is laid to the forming face area, after the movement reaches the end point, the roller 13 moves upwards by a certain height, then the roller 13 reversely moves from right to left, the material 12 to be processed on the forming face is compacted, finally the material 12 to be processed returns to the original position, and therefore laying work of a new layer of material is completed.

Preferably, the gas protection unit 5 is used for filling protection gas into the closed working cavity, so that the additive forming process is carried out in an inert atmosphere with the concentration of 99.99%. The flow of carrier gas is not lower than 4 L/min, and the oxygen content of the working cavity is kept to be reduced in the additive forming period, so that the part forming layer is prevented from being polluted or oxidized.

Adaptive changes made according to actual requirements are all within the protection range of the present disclosure.

It needs to be noted that for those skilled in the art, obviously the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is restricted by the claims appended hereto, and therefore, all changes, including the meanings and scopes of equivalent elements, of the claims are aimed to be included in the present disclosure. Any mark of attached figures in the claims should not be regarded to limit the involved claims.

What is claimed is:

1. A high-energy beam additive manufacturing forming method, applying a high-energy beam additive manufacturing forming device, wherein the high-energy beam additive manufacturing forming device comprises:
   a magnetic field unit comprising:
   a first magnetic field generating device,
   wherein the first magnetic field generating device comprises induction coils arranged below a molten pool, and at any time, the molten pool formed by melting a material to be processed is located in an area where clustered magnetic induction lines are emitted from the induction coils;

when the number of the induction coils is multiple, the induction coils are evenly arranged in the forming area of the molten pool; and the adjacent induction coils are parallel, and the distances between the induction coils and the molten pool are equal; and second magnetic field generating devices which generate a steady-state magnetic field and/or an alternating magnetic field and act on the molten pool, wherein the second magnetic field generating devices are arranged above the molten pool;

a forming base for placing a material to be processed, and a high-energy beam generation device, which emits a high-energy beam, acts on the material to be processed and forms a molten pool, wherein the high-energy beam generation device is arranged above the forming base, the first magnetic field generating device is detachably arranged below a surface of the forming base used for containing the material to be processed, and the second magnetic field generating devices are arranged above the forming base; and the high-energy beam additive manufacturing forming method comprises the following steps:

(a) placing a material to be processed on the forming base;

(b) generating a high-energy beam by a high-energy beam generation device, wherein the high-energy beam acts on the material to be processed in a set path, so that a molten pool is formed by the material to be processed;

(c) loading alternating voltage by a first magnetic field generating device, so that the induction coils generate an alternating magnetic field to act on the molten pool; and (d) stacking a plurality of additive forming layers to obtain a forming part.

2. The high-energy beam additive manufacturing forming method according to claim 1, wherein the forming base is of a hollow box-shaped structure, the induction coils and a water cooling device used for cooling the induction coils are sequentially arranged in the forming base, the water cooling device is arranged below the induction coils, and an insulating heat dissipation layer is arranged between the induction coils and the water cooling device.

3. The high-energy beam additive manufacturing forming method according to claim 2, further comprising a closed working cavity and a gas protection unit used for filling protection gas into the working cavity; and the high-energy beam generation device, the forming base, the feeding device and the second magnetic field generating devices are all arranged in the working cavity.

4. The high-energy beam additive manufacturing forming method according to claim 2, wherein in step (c), the induction coils in the first magnetic field generating device, corresponding to a high-energy beam processing area, are used for loading alternating voltage; and in step (c), a steady-state magnetic field and/or an alternating magnetic field generated by second magnetic field generating devices acts on the molten pool.

5. The high-energy beam additive manufacturing forming method according to claim 1, further comprising a first lifting device used for pushing the forming base to move up and down, wherein the first lifting device is arranged below the forming base, and a lifting part of the first lifting device is fixedly connected with the forming base; the high-energy beam additive manufacturing forming device further comprises a feeding device arranged on one side of the forming base, and the feeding device comprises a powder supply cylinder used for storing a material to be processed and a roller used for evenly laying the material to be processed to the forming base; and a feeding bottom plate used for supporting the material to be processed to move up and down and a second lifting device for pushing the feeding bottom plate to move up and down are arranged in the powder supply cylinder, and a lifting part of the second lifting device is fixedly connected with the feeding bottom plate.

6. The high-energy beam additive manufacturing forming method according to claim 5, wherein in step (c), the induction coils in the first magnetic field generating device, corresponding to a high-energy beam processing area, are used for loading alternating voltage; and in step (c), a steady-state magnetic field and/or an alternating magnetic field generated by second magnetic field generating devices acts on the molten pool.

7. The high-energy beam additive manufacturing forming method according to claim 1, wherein in step (c), the induction coils in the first magnetic field generating device, corresponding to a high-energy beam processing area, are used for loading alternating voltage; and in step (c), a steady-state magnetic field and/or an alternating magnetic field generated by second magnetic field generating devices acts on the molten pool.

* * * * *